United States Patent [19]

Risley

[11] 4,331,227
[45] May 25, 1982

[54] BOTTLE WASHER DISCHARGE SORTING ARRANGEMENT

[75] Inventor: Robert F. Risley, Wilton, Conn.

[73] Assignee: PepsiCo Inc., Purchase, N.Y.

[21] Appl. No.: 242,414

[22] Filed: Mar. 10, 1981

Related U.S. Application Data

[63] Continuation-in-part of Ser. No. 83,669, Oct. 11, 1979.

[51] Int. Cl.³ .............................................. B65G 47/12
[52] U.S. Cl. .................................. 198/339; 198/445; 198/447; 209/539; 209/934; 209/522
[58] Field of Search ............... 209/523, 522, 934, 539; 198/445, 447, 339; 15/306 B

[56] References Cited

U.S. PATENT DOCUMENTS

| | | | |
|---|---|---|---|
| 3,710,918 | 1/1973 | Babunovic | 198/445 |
| 3,759,368 | 9/1973 | Rose et al. | 198/445 |
| 4,142,636 | 3/1979 | Planke | 209/934 X |

FOREIGN PATENT DOCUMENTS

| | | | |
|---|---|---|---|
| 2511206 | 9/1976 | Fed. Rep. of Germany | 198/445 |
| 2737458 | 3/1979 | Fed. Rep. of Germany | 198/445 |

Primary Examiner—Allen N. Knowles
Attorney, Agent, or Firm—Scully, Scott, Murphy & Presser

[57] ABSTRACT

An arrangement for sorting a plurality of bottles, discharged from a bottle washer in random fashion, into spaced single file columns on a plurality of parallel conveyor belts arranged substantially perpendicular to the direction of bottle discharge. Guides selectively extend across the top of the conveyor belts in the direction of the discharge of bottles from the washer, and are utilized to divide the randomly discharged bottles into a number of fractional portions, with each fractional portion being directed onto one of the conveyor belts. The guides are side rails extending in the discharge direction of the bottles substantially transversely to the direction of travel of the conveyor belts. The guide rails serving a particular conveyor belt extend to the edge of that belt at which they are curved in the upstream direction from which the belt is traveling to facilitate an orderly discharge of a single column of spaced bottles onto that belt.

7 Claims, 4 Drawing Figures

BOTTLE WASHER DISCHARGE SORTING ARRANGEMENT

This application is a continuation-in-part application of parent application Ser. No. 083,669, filed Oct. 11, 1979.

BACKGROUND OF THE INVENTION

1. Field of the Invention

The present invention pertains generally to the field of sorting of objects and more particularly relates to technology for sorting the output of a bottle washing machine into a plurality of single file columns to enable inspection of the bottles on an individual basis.

2. Description of the Prior Art

Conventional bottle washing arrangements utilize a mass sorting concept wherein the bottles are discharged randomly, and then commercially available combiner and divider equipment and conveyors are utilized to combine the containers into a single file column for inspection. A conventional arrangement of this nature requires a considerable amount of floor space for the equipment, and also the necessary equipment requires periodic maintenance, consumes a considerable amount of power during operation, and also results in the generation of substantial amounts of noise.

German Offenlegungschrift No. 25 11 206 is considered to be fairly pertinent to the present invention, and discloses an arrangement for sorting the output of a bottle washing machine in which the output thereof is directed onto a set of four moving conveyor belts. In the disclosed arrangement a plurality of flat distributor plates or guides of different lengths extend at an angle across the moving belts and serve to discharge the bottles onto the several different conveyor belts. However, this reference is deficient in teaching a bottle washing arrangement which is designed to facilitate an orderly progression of bottles onto the discharge conveyor belts. More specifically this German Offenlegungsschrift does not disclose an arrangement wherein the bottle guides have ends curved in a direction towards the upstream direction from which the conveyor belts are traveling to cause the bottles at the ends of the deflector plates to be slowed in their travel onto conveyor belts to facilitate an orderly progression of bottles from the bottle washer onto the discharge conveyor belts.

Casey, et al. U.S. Pat. No. 3,903,563 discloses a machine for washing and sorting bottles. The bottles enter the machine in single file, and are also discharged therefrom in single file. One embodiment therein utilizes an arrangement for unscrambling bottles and arranging them in a continuous straight line relationship as they enter the machine. The unscrambler includes a flat bed comprising a plurality of conveyor belts arranged with adjacent belts moving in opposite directions. However, although the conveyor belts are used to sort the bottles, they are not arranged in a manner as in the present invention wherein individual belts are used to sort the output of a bottle washing machine.

Keller U.S. Pat. No. 2,073,746 discloses a bottle cleaning machine wherein the bottles are arranged in a parallel line upon a section of a conveyor adapted to be moved intermittently through the machine. However, this patent also does not disclose an arrangement for sorting bottles at the discharge end of a machine by the utilization of plural conveyor belts arranged parallel to each other and perpendicular to the direction of discharge of the bottles from the machine.

Whelan U.S. Pat. Nos. 2,915,773 and Whelan 2,967,321, disclose bottle cleaning arrangements wherein the discharge output of the cleaning machine is onto a single linear conveyor belt. In these patents a rotary transfer disc transfers the cleaned containers onto a discharge conveyor belt. Copping et al. U.S. Pat. No. 3,495,291 discloses a bottle cleaning arrangement wherein the bottles are discharged onto a linear conveyor belt. In further detail, a bottle inverting means at the discharge end of the rinsing machine transfers the vertical orientation of each bottle from an inverted to an upright position and deposits the bottles onto a suitable conveyor belt. Aidlin et al. U.S. Pat. No. 4,017,350 discloses a bottle cleaning machine in which the bottles at the discharge output of the machine are deposited onto a suitable conveyor belt. Standley U.S. Pat. No. 4,179,674 discloses a bottle washing machine in which the bottles are gripped by a unit at the discharge end of the machine which inverts the bottles from an inverted to an upright position and deposits them upon a single output conveyor belt.

SUMMARY OF THE INVENTION

A primary object of the present invention is the provision of an arrangement for sorting in an orderly manner a plurality of items randomly positioned across a conveyor means on which they are advanced into a plurality of single file columns.

A more specific object of the present invention is the provision of an arrangement for sorting the output of a bottle washing machine which deposits a plurality of bottles onto a plurality of discharge conveyor belts in an orderly progression.

Arrangements are disclosed for sorting the bottles into two, three, four, five, and six in one embodiment single file rows with each row being carried by an individual conveyor belt. Another object of the present invention lies in the provision of an arrangement which discharges bottles in single rows on single conveyors in a manner which eliminates the need to combine the bottles into single rows by such typical equipment as combiners, dividers and conveyors, etc. Accordingly it eliminates the more complicated equipment required by prior art arrangements, and also results in a attendant reduction in the required floor space, power consumption, soap lubrication required by fewer conveyors, power consumption required by less equipment and also noise and maintenance because of the more simplified arrangement.

In accordance with several preferred embodiments of the present invention, arrangements are disclosed for sorting a plurality of items arranged in a random fashion, into at least two single file columns.

The items to be sorted are carried by a conveyor means to at least two conveyor belts arranged substantially parallel to each other. The conveyor belts are positioned adjacent to the conveyor means and also perpendicular thereto such that items advanced by the conveying means are deposited onto the conveyor belts. A plurality of guides extend across the top of the conveyor belt or belts closest to the conveying means, and serve to carry items across the nearer conveyor belts to the more distant belts. Moreover, each guide is curved at its end in the upstream direction from which the conveyor belts are traveling, and the curved ends tend to slow the progress of advanced items onto the conveyor belts. The curved ends also tend to stack the items at the ends and slow their progress onto the conveyor belts to facilitate an orderly discharge of the items onto the conveyor belts. In all of the disclosed embodiments, each of the more distant belts is served by a separate set of guides.

In one disclosed arrangement, the items to be sorted are containers, in particular bottles, discharged from a washing machine. The sorter includes first and second conveyor belts, and a plurality of container guides extend across the top surface of the conveyor belt closest to the conveying means to the conveyor belt more distant therefrom. The guides extend across a portion of the width of the conveying means, approximately 50%, such that containers advanced in the portion occupied by the guides are deposited onto the more distant belt. Containers advanced by the conveying means outside the portion with the guides are deposited onto the closest conveyor belt.

In a second disclosed embodiment of the invention, three conveyor belts are provided, and the plurality of container guides includes a first plurality of guides extending across the top surfaces of the first and second conveyor belts closest to the conveyor means to deposit containers onto the most distant belt. A second plurality of container guides extend across only the conveyor belt closest to the conveying means to deposit containers advanced thereby onto the middle conveyor belt. Approximately a third of the containers advanced by the conveyor means do not encounter any container guides, and are advanced onto the conveyor belt closest to the conveying means.

In all of the disclosed arrangements, the containers are bottles deposited at the output of a bottle washing machine onto the conveying means in a somewhat random fashion. The conveyor belt and container guides serve to sort the containers into single file columns which are discharged onto the conveyor belts in an orderly fashion. The orderly discharge allows bottle inspection equipment, positioned adjacent to each conveyor belt, to individually inspect each bottle in the single file of containers carried by the belt. In several of the embodiments disclosed herein, the conveyor belts all travel in substantially the same direction adjacent to the conveying means, and in another disclosed embodiment, the conveyor belts travel in opposite directions adjacent to the conveyor means.

Accordingly, an important object of the present invention is the provision of an arrangement for orderly sorting of a plurality of containers randomly positioned across a conveyor means by which they are advanced into a plurality of single file columns.

A more specific object of the present invention is the provision of an arrangement for orderly sorting of the output of a bottle washing which includes a plurality of bottles randomly positioned across the width of a conveying means.

BRIEF DESCRIPTION OF THE DRAWINGS

The foregoing and other objects and advantages of a novel sorting arrangement constructed pursuant to the teachings of the present invention may be more readily understood by one skilled in the art, with reference being had to the following detailed description of several preferred embodiments thereof, taken in conjunction with the accompanying drawings wherein identical reference numerals are utilized to refer to like elements throughout the several views, and in which.

DETAILED DESCRIPTION OF THE DRAWINGS

Figure 1:
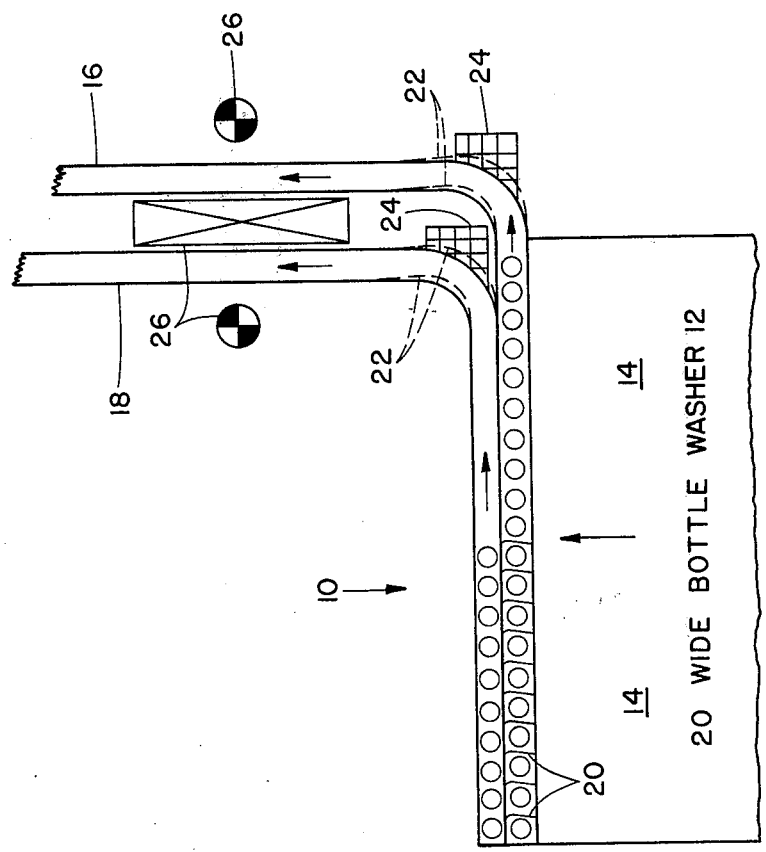
FIG. 1 is a schematic representation of a first embodiment of the present invention wherein the output of a bottle washer is discharged onto two conveyor belts in two single file columns, one on each of the belts.

FIG. 1 is a schematic illustration of an arrangement 10 for dividing the output of a bottle washing machine 12 which is capable of delivering twenty bottles across the width of a conveying means 14 at the discharge output of the washer. During normal operation of the machine, bottles are discharged therefrom in a substantially random manner. Two parallel conveyor belts 16 and 18 are positioned substantially perpendicular to the discharge direction of the washing machine. In the particular embodiment being described, the conveyor belts are adapted to carry the containers discharged thereon in the same direction, to the right as illustrated in FIG. 1. A plurality of container guides 20, which may be merely side rails, extend in the direction of the discharge of bottles from the washing machine transversely to the direction of travel of the conveyor belts. The side rails extend across the top of the conveyor belt 16 immediately adjacent to the bottle washer discharge to the edge of the more distant belt 18, at which they are curved in the upstream direction from which the conveyor belts are traveling. The curved ends tend to slow the progress of advanced bottles onto the conveyor belts. The curved ends also tend to stack the bottles at the ends and slow their progress onto the conveyor belts to facilitate an orderly discharge thereof onto the conveyor belts in spaced single columns of bottles. Adjacent container guides 20 are adapted to carry the bottles deposited therebetween across the width of the first conveyor belt 16 onto the more distant conveyor belt 18. In the arrangement, the container guides extend across the left half of the width of the output of the bottle washer, and thereby deposit approximately one half of the bottles discharged by the bottle washer onto conveyor belt 14. The remaining half of the bottles are directed by conveying means 14, without encountering any container guides, onto the conveyor belt 16 closest to the bottle washer. The first and second single file rows of bottles carried by conveyor belts 16 and 18 are directed past an optical inspection system 26 which functions in a known manner to measure the transmission of generally visible radiation by the bottles. The optical inspection system is not described in detail herein as it is a type of system which is well known in the art.

Each of conveyor belts 16 and 18 have a guide rail arrangement 22 at a location where the conveyor belt takes an approximately 90° turn. A broken glass receptacle 24 is provided at that corner, in a known manner, to provide for the removal of broken bottles or glass fragments.

Figure 2:
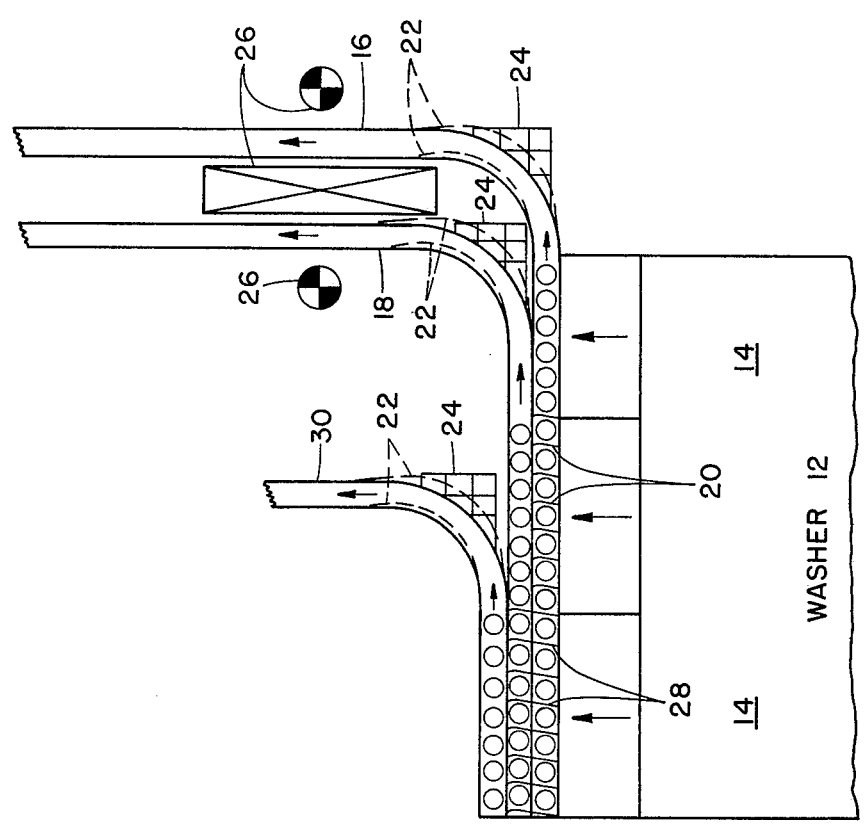
FIG. 2 is a schematic representation of a second embodiment of the present invention wherein the output of a bottle washer is directed onto three conveyor belts which divide the discharged bottles into three single file columns, one on each of the belts.

A second embodiment of the present invention, similar in many respects to the first embodiment, is illustrated in FIG. 2 of this application, and includes an arrangement for sorting the output of a bottle washer 12 into three single file rows of containers. In this embodiment, the bottles discharged on the right third portion of the width of conveying means 14 are deposited directly onto conveyor belt 16 in a manner similar to the embodiment of FIG. 1. The bottles carried by the conveying means 14 in the central third portion of its width are directed by guide rails 20 onto the middle conveyor belt 18 in a manner similar to the operation of the embodiment of FIG. 1. The bottles discharged by washer 12 onto the left third portion of the width of the conveying means 14 encounter a second set of guide rails 28 which extend across the top surfaces of the first and second conveyor belts 16 and 18 to the edge of a third conveyor belt 30. In general the operation of this embodiment is substantially similar to the operation of the embodiment of FIG. 1, but functions to divide the output of bottle washing machine 12 into three single file columns of bottles on the three conveyor belts 16, 18 and 30.

Figure 3:
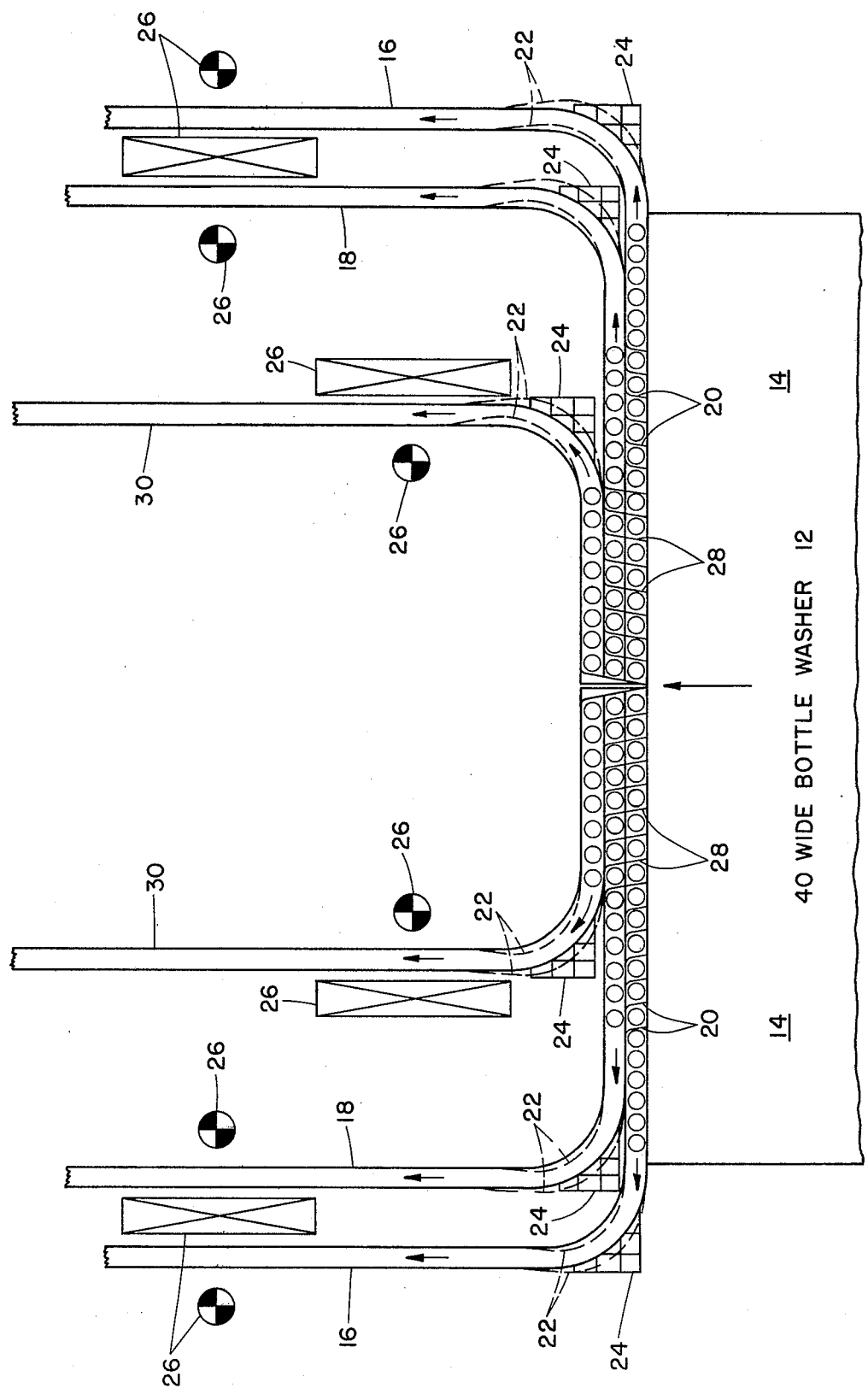
FIG. 3 is a schematic representation of a third embodiment of the present invention wherein the output of a bottle washer is discharged onto six conveyor belts which divide the output of the washer into six single file columns, one on each of the conveyor belts.

FIG. 3 illustrates a third embodiment of the present invention wherein a bottle washer 12 has a capacity of delivering forty bottles across the width of a conveying means 14. This particular embodiment utilizes a total of six different conveyor belts to sort the bottles into six single file columns of bottles. In this particular embodiment, three belts 16, 18 and 30 are positioned in the left half portion of the width of conveying means 14. Each belt rises vertically at approximately the middle of the width of conveying means 14, and then takes a 90° bend to a substantially horizontal position. The embodiment of FIG. 3 also includes a second arrangement of three conveyor belts 16, 80 and 30 on the right half portion of the width of conveying means 14, which is substantially a mirror image of the left half of the arrangement as described above. Each half of the machine includes a first plurality of side rails 20 which extend across approximately one sixth of the width of conveying means 14, such that each set of guide rails 20 on each half of the machine deposits approximately one sixth of the containers advanced by conveyor 14 onto each of the two middle conveyor belts 18. A second plurality of guide rails 28 are provided on each of the left and right halves of the machine, with each plurality of rails being positioned immediately adjacent to the center of the machine. Each set of rails 28 function to guide containers deposited at the output of bottle washing machine 12 across the top surfaces of the first two conveyor belts 16 and 18 onto the third conveyor belt 30.

Figure 4:
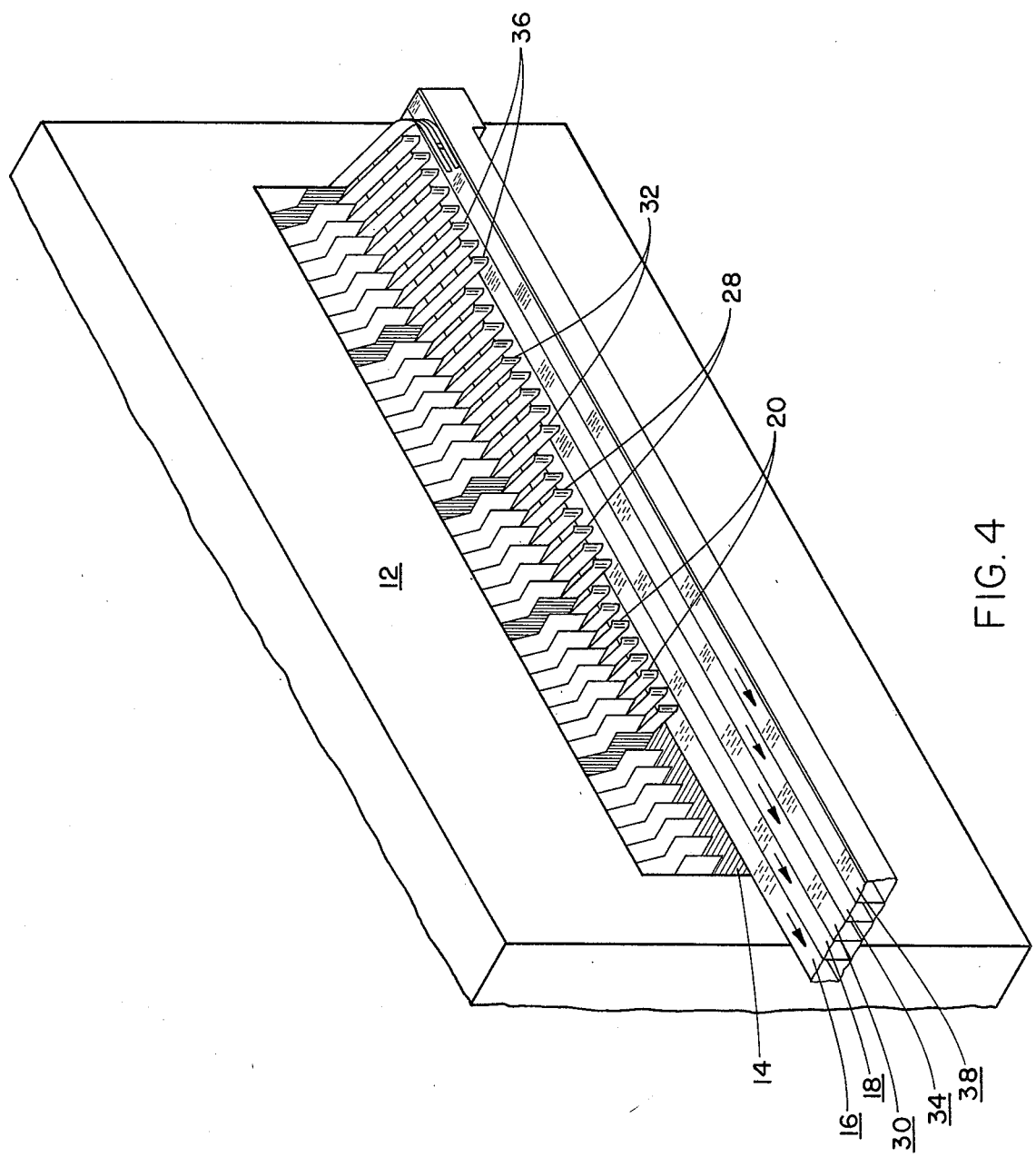
FIG. 4 is a perspective view of a fourth embodiment of the present invention wherein the output of a washing machine is divided into five single file rows by five conveyor belts.

FIG. 4 is a perspective view of a fourth embodiment of the present invention wherein the output of a washing machine 12 is divided into five single file columns on five conveyor belts, all traveling in the same direction. The containers deposited by washing machine 12 onto the left fifth of the width of conveyor means 14 are carried thereby directly onto the first conveyor belt 16. The containers deposited at the output of washer 12 onto the next left fifth of the width of conveyor means 14 are guided by rails 20 across the top surface of the first belt 16 onto the second conveyor belt 18. Likewise, containers deposited by washer 12 onto the middle fifth of the width of conveyor means 14 are guided by rails 28 over the first two conveyors 16 and 18 to the third conveyor belt 30. A third set of guide rails 32 are provided along the central right fifth portion of the width of conveyor means 14. The rails 32 extend over the top surfaces of the first three conveyor belts 16, 18 and 30 to guide bottles to a fourth conveyor belt 34. A fourth set of guide rails 36 are provided for the extreme right fifth of the width of conveyor means 14 to guide bottles deposited by machine 12 in that portion of the width across the top surfaces of conveyor belts 16, 18, 30 and 34 to a fifth conveyor belt 38.

It is apparent that the teachings of the present invention may be utilized to sort and divide bottles into any number of portions, depending upon the number of conveyor belts and sets of guide rails provided, which may be quite high in number as illustrated with regard to the embodiment of FIG. 4. Further, as illustrated by the embodiment of FIG. 3, two sets of conveyor belts may be utilized, one set for each half of the output of the bottle washing machine.

In each of the illustrated embodiments, the guide rails slant slightly in the direction of travel of the conveyor belts over which the guide rails are placed. This enables a bottle to be advanced forwardly by a conveyor belt against the downstream guide rail to the next conveyor belt which also advances the bottle against the downstream guide rails, etc. until the bottle reaches the conveyor belt upon which it is to be deposited. At that conveyor belt, the curved end of the guide rail tends to slow the advancement of the bottles and stack them thereat. This arrangement facilitates an orderly discharge of the bottles onto the conveyor belts in spaced, single columns, in which the bottle inspection equipment can individually inspect each bottle. Each of the guide rails may be a relatively low side wall, as illustrated in the embodiment of FIG. 4, or alternatively could take the form of a wire guide, bar, etc. Furthermore, although all of the embodiments have been described in the context of the environment of a bottle washing machine, it may be appreciated that the teachings of the present invention have applicability to other situations wherein items of merchandise in general are to be sorted into a number of single file columns, either for an inspection of each item or for some other purpose.

While several embodiments of the present invention have been described in detail herein, it may be appreciated that the teachings of the present invention will suggest many alternative variations and embodiments to one of ordinary skill in the art.

What is claimed is:

1. An arrangement for sorting a plurality of items into at least two single file columns, comprising:
   a. means for conveying a plurality of items in a forward direction;
   b. at least two conveyor belts arranged substantially parallel to each other, and substantially perpendicular to said conveying means with one conveyor belt being adjacent thereto, such that items advanced in the forward direction by said conveying means are deposited onto the conveyor belt adjacent to the conveying means;
   c. a plurality of guides extending substantially in said forward direction across the top surface of said adjacent conveyor belt along a portion of the width of the conveying means to a conveyor belt distant from said conveying means at which each guide has a far end, said guides being curved at their far ends in a direction towards the upstream direction from which the conveyor belts are traveling, whereby items advanced to the plurality of guides are directed thereby to said more distant conveyor belt to be carried by that belt in a single column and items advanced onto said adjacent conveyor belt without encountering guides will be carried by that belt in a single file column.

2. An arrangement for sorting a plurality of items as claimed in claim 1, said at least two conveyor belts comprising first and second conveyor belts, said plurality of guides extending across the top of the first conveyor belt adjacent to said conveying means to the second conveyor belt more distant from the conveying means, said plurality of guides extending along approximately half the width of said conveying means, whereby items advanced in said half are deposited onto said second more distant belt, and items advanced by said conveying means in the remaining half of said conveying means are deposited upon said closest conveyor belt.

3. An arrangement for sorting a plurality of items as claimed in claim 1, said at least two conveyor belts comprising three conveyor belts, said plurality of guides including a first plurality of guides extending along approximately one third the width of said conveying means and across the top of the first and second conveyor belts closest to said conveyor means to deposit items on the third more distant belt, and a second plurality of container guides extending along approximately one third the width of said conveying means and across only the conveyor belt closest to said conveying means to deposit items advanced thereby onto the middle second conveyor belt, and some of the items advanced by said conveying means not encountering any guides and being advanced onto the first conveyor belt closest to said conveying means.

4. An arrangement for sorting a plurality of items as claimed in claim 1, said at least two conveyor belts including conveyor belts moving in the same direction by said conveying means.

5. An arrangement for sorting a plurality of containers as claimed in claim 1, said at least two conveyor belts including conveyor belts moving in opposite directions by said conveying means.

6. An arrangement for sorting a plurality of items as claimed in either of claims 1 or 2 or 3 or 4 or 5, said items being bottles, said conveying means being at the output of a bottle washing machine and receiving bottles washed thereby in a somewhat random manner, said conveyor belts and plurality of guides serving to sort the bottles into single file columns on the plurality of conveyor belts.

7. An arrangement for sorting a plurality of bottles as claimed in claim 6, including bottle inspection means positioned adjacent each conveyor belt to enable each bottle in a single file of bottles being carried by a belt to be individually inspected.

* * * * *